United States Patent
Matsumura et al.

(10) Patent No.: US 9,407,918 B2
(45) Date of Patent: Aug. 2, 2016

(54) APPARATUS AND METHOD FOR CODING IMAGE, AND NON-TRANSITORY COMPUTER READABLE MEDIUM THEREOF

(75) Inventors: Atsushi Matsumura, Kanagawa-ken (JP); Shinichiro Koto, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 250 days.

(21) Appl. No.: 13/593,664

(22) Filed: Aug. 24, 2012

(65) Prior Publication Data

US 2013/0188885 A1 Jul. 25, 2013

(30) Foreign Application Priority Data

Jan. 25, 2012 (JP) ................................. 2012-013375

(51) Int. Cl.
| | |
|---|---|
| G06K 9/36 | (2006.01) |
| H04N 19/137 | (2014.01) |
| H04N 19/50 | (2014.01) |
| H04N 19/176 | (2014.01) |
| H04N 19/103 | (2014.01) |
| H04N 19/132 | (2014.01) |
| H04N 19/13 | (2014.01) |
| H04N 19/91 | (2014.01) |

(52) U.S. Cl.
CPC ........... *H04N 19/137* (2014.11); *H04N 19/103* (2014.11); *H04N 19/132* (2014.11); *H04N 19/176* (2014.11); *H04N 19/50* (2014.11); *H04N 19/13* (2014.11); *H04N 19/91* (2014.11)

(58) Field of Classification Search
None
See application file for complete search history.

(56) References Cited

U.S. PATENT DOCUMENTS

| | | | | |
|---|---|---|---|---|
| 6,426,975 | B1 * | 7/2002 | Nishi et al. | 375/240.13 |
| 7,242,716 | B2 * | 7/2007 | Koto et al. | 375/240.16 |
| 7,366,237 | B2 * | 4/2008 | Yu et al. | 375/240.16 |
| 2005/0013359 | A1 * | 1/2005 | Srinivasan | 375/240.03 |

FOREIGN PATENT DOCUMENTS

| | | |
|---|---|---|
| JP | 2005-027081 | 1/2005 |
| JP | 2007-336056 | 12/2007 |
| JP | 2011-019096 | 1/2011 |

OTHER PUBLICATIONS

ISO/IEC 14495-1: 1999 Annex A A.4 Prediction, (Published before this application Jan. 2012).
Office Action of Notice of Reasons for Refusal for Japanese Patent Application No. 2012-013375 Dated Feb. 6, 2015, 5 pages.

* cited by examiner

*Primary Examiner* — Eueng-Nan Yeh
(74) *Attorney, Agent, or Firm* — Amin, Turocy & Watson LLP

(57) ABSTRACT

According to one embodiment, a prediction unit generates a prediction block to be used for prediction of a coding target block, based on at least one reference block adjacent to the coding target block in the image. Each number of pixels in the coding target block and the prediction block is a power of two. A calculation unit calculates a residual block having residual pixel values between the coding target block and the prediction block. A decision unit decides whether to code the residual block, based on pixel values of at least one of the coding target block, the reference block and the prediction block. A coding unit codes the residual block by variable length coding when the residual block is decided to be coded, and codes a skip flag representing the residual block not being coded when the residual block is not decided to be coded.

15 Claims, 15 Drawing Sheets

| | | | | | | | | | | | | | | | | | |
|---|---|---|---|---|---|---|---|---|---|---|---|---|---|---|---|---|---|
| UPPER PIXEL LINE | $P_{-1}$ | $P_0$ | $P_1$ | $P_2$ | $P_3$ | $P_4$ | $P_5$ | $P_6$ | $P_7$ | $P_8$ | $P_9$ | $P_{10}$ | $P_{11}$ | $P_{12}$ | $P_{13}$ | $P_{14}$ | $P_{15}$ |
| CODING TARGET LINE | $X_{-1}$ | $X_0$ | $X_1$ | $X_2$ | $X_3$ | $X_4$ | $X_5$ | $X_6$ | $X_7$ | $X_8$ | $X_9$ | $X_{10}$ | $X_{11}$ | $X_{12}$ | $X_{13}$ | $X_{14}$ | $X_{15}$ |

| PIXEL BLOCK AS CODING TARGET | $X_0$ | $X_1$ | $X_2$ | $X_3$ | $X_4$ | $X_5$ | $X_6$ | $X_7$ | $X_8$ | $X_9$ | $X_{10}$ | $X_{11}$ | $X_{12}$ | $X_{13}$ | $X_{14}$ | $X_{15}$ |
|---|---|---|---|---|---|---|---|---|---|---|---|---|---|---|---|---|
| REFERENCE BLOCK A | $X_{-1}$ | $X_0$ | $X_1$ | $X_2$ | $X_3$ | $X_4$ | $X_5$ | $X_6$ | $X_7$ | $X_8$ | $X_9$ | $X_{10}$ | $X_{11}$ | $X_{12}$ | $X_{13}$ | $X_{14}$ |
| REFERENCE BLOCK B | $P_{-1}$ | $P_0$ | $P_1$ | $P_2$ | $P_3$ | $P_4$ | $P_5$ | $P_6$ | $P_7$ | $P_8$ | $P_9$ | $P_{10}$ | $P_{11}$ | $P_{12}$ | $P_{13}$ | $P_{14}$ | $P_{15}$ |
| REFERENCE BLOCK C | | $P_{-1}$ | $P_0$ | $P_1$ | $P_2$ | $P_3$ | $P_4$ | $P_5$ | $P_6$ | $P_7$ | $P_8$ | $P_9$ | $P_{10}$ | $P_{11}$ | $P_{12}$ | $P_{13}$ | $P_{14}$ |

FIG. 3

K=0, RESIDUAL PIXEL VALUE — GOLOMB CODING (EACH MASS IS SYMBOL OF ONE BIT)

| Value | b1 | b2 | b3 | b4 | b5 | b6 | b7 | b8 | b9 | b10 | b11 | b12 | b13 | b14 | b15 | b16 |
|---|---|---|---|---|---|---|---|---|---|---|---|---|---|---|---|---|
| 0 | | | | | | | 1 | | | | | | | | | |
| -1 | | | | | | 0 | 1 | | | | | | | | | |
| 1 | | | | | 0 | 0 | 1 | | | | | | | | | |
| -2 | | | | 0 | 0 | 0 | 1 | | | | | | | | | |
| 2 | | | 0 | 0 | 0 | 0 | 1 | | | | | | | | | |
| -3 | | 0 | 0 | 0 | 0 | 0 | 1 | | | | | | | | | |
| 3 | 0 | 0 | 0 | 0 | 0 | 0 | 1 | | | | | | | | | |
| -4 | 0 | 0 | 0 | 0 | 0 | 0 | 0 | 1 | | | | | | | | |
| 4 | 0 | 0 | 0 | 0 | 0 | 0 | 0 | 0 | 0 | 0 | 0 | 0 | 0 | 0 | 0 | 0 |
| -5 | 0 | 0 | 0 | 0 | 0 | 0 | 0 | 0 | 0 | 0 | 0 | 0 | 0 | 0 | 0 | 1 |
| 5 | 0 | 0 | 0 | 0 | 0 | 0 | 0 | 0 | 0 | 0 | 0 | 0 | 0 | 0 | 1 | 0 |

FIG. 5A

K=1, RESIDUAL PIXEL VALUE — GOLOMB CODING (EACH MASS IS SYMBOL OF ONE BIT)

| Value | b1 | b2 | b3 | b4 | b5 | b6 | b7 | b8 | b9 | b10 | b11 | b12 | b13 | b14 | b15 | b16 |
|---|---|---|---|---|---|---|---|---|---|---|---|---|---|---|---|---|
| 0 | | | | | | | 1 | 0 | | | | | | | | |
| -1 | | | | | | | 1 | 1 | | | | | | | | |
| 1 | | | | | | 0 | 1 | 0 | | | | | | | | |
| -2 | | | | | | 0 | 1 | 1 | | | | | | | | |
| 2 | | | | | 0 | 0 | 1 | 0 | | | | | | | | |
| -3 | | | | | 0 | 0 | 1 | 1 | | | | | | | | |
| 3 | | | | 0 | 0 | 0 | 1 | 0 | | | | | | | | |
| -4 | | | | 0 | 0 | 0 | 1 | 1 | | | | | | | | |
| 4 | | | 0 | 0 | 0 | 0 | 1 | 0 | | | | | | | | |
| -5 | | | 0 | 0 | 0 | 0 | 1 | 1 | | | | | | | | |
| 5 | | 0 | 0 | 0 | 0 | 0 | 1 | 0 | | | | | | | | |
| -6 | | 0 | 0 | 0 | 0 | 0 | 1 | 1 | | | | | | | | |
| 6 | 0 | 0 | 0 | 0 | 0 | 0 | 1 | 0 | | | | | | | | |
| -7 | 0 | 0 | 0 | 0 | 0 | 0 | 1 | 1 | | | | | | | | |
| 7 | 0 | 0 | 0 | 0 | 0 | 0 | 0 | 1 | 0 | | | | | | | |
| -8 | 0 | 0 | 0 | 0 | 0 | 0 | 0 | 1 | 1 | | | | | | | |
| 8 | 0 | 0 | 0 | 0 | 0 | 0 | 0 | 0 | 0 | 0 | 0 | 0 | 0 | 0 | 0 | 0 |
| -9 | 0 | 0 | 0 | 0 | 0 | 0 | 0 | 0 | 0 | 0 | 0 | 0 | 0 | 0 | 0 | 1 |

FIG. 5B

APPARATUS AND METHOD FOR CODING IMAGE, AND NON-TRANSITORY COMPUTER READABLE MEDIUM THEREOF

CROSS-REFERENCE TO RELATED APPLICATION

This application is based upon and claims the benefit of priority from Japanese Patent Application No. 2012-013375, filed on Jan. 25, 2012; the entire contents of which are incorporated herein by reference.

FIELD

Embodiments described herein relate generally to an apparatus and a method for coding an image, and a non-transitory computer readable medium.

BACKGROUND

An image coding method for generating coded data by subjecting image data to lossless coding, is well known. As the image coding method of conventional technique, by switching a prediction direction for each pixel based on a gradient of pixel values between adjacent pixels, a difference of pixel values between a coding target pixel and a prediction pixel is coded (encoded). However, in this method, each pixel is subjected to coding (encoding). Accordingly, coding cannot be effectively performed.

As another image coding method of convention technique, by segmenting an input image into a plurality of pixel blocks, each pixel block is decided whether to code or skip. However, based on a size of the pixel block, effective coding cannot be often performed.

As the other image coding method of conventional technique, by calculating a prediction pixel for each pixel block, each pixel is decided whether to code or skip. However, in this method, each pixel is decided. Accordingly, coding cannot be quickly performed.

Briefly, in this technical area, an apparatus for quickly and effectively coding an image is desired.

BRIEF DESCRIPTION OF THE DRAWINGS

FIG. 3 is a schematic diagram showing relationship between a coding target block and reference blocks thereof.

FIGS. 5A and 5B are schematic diagrams showing examples of Golomb coding table.

DETAILED DESCRIPTION

According to one embodiment, an apparatus for coding a coding target block in an image is provided. The apparatus includes a prediction unit, a calculation unit, a decision unit, and a coding unit. The prediction unit is configured to generate a prediction block to be used for prediction of the coding target block, based on at least one reference block adjacent to the coding target block in the image. Each number of pixels in the coding target block and the prediction block is a power of two. The calculation unit is configured to calculate a residual block having residual pixel values between the coding target block and the prediction block. The decision unit is configured to decide whether to code the residual block, based on pixel values of at least one of the coding target block, the reference block and the prediction block. The coding unit is configured to code the residual block by variable length coding when the residual block is decided to be coded, and to code a skip flag representing the residual block not being coded when the residual block is not decided to be coded.

Various embodiments will be described hereinafter with reference to the accompanying drawings.

The First Embodiment

As to the image coding apparatus 1 of the first embodiment, an acquired image is coded by using lossless coding. For example, this apparatus is suitable for a PC server to store or transmit medical image data photographed by a CT device or a MRI.

The image coding apparatus 1 can code (encode) the image data by SIMD (Single Instruction Multiple Data). The SIMD can simultaneously execute operation processing for a plurality of data by one instruction.

In an image acquired, the image coding apparatus 1 performs processing for each block having pixels of which the number is a power of two. As a result, image data can be coded according to SIMD.

The image coding apparatus 1 generates a prediction block of a coding target block, and, based on information calculated by generating the prediction block, decides whether a residual block between the coding target block and the prediction block is coded by using variable length coding. When the decision is true, the residual block is coded by using variable length coding. When the decision is false, the residual block is coded as a flag representing a coding skip. As a result, the image coding apparatus 1 can quickly and effectively code the image data.

Figure 1:
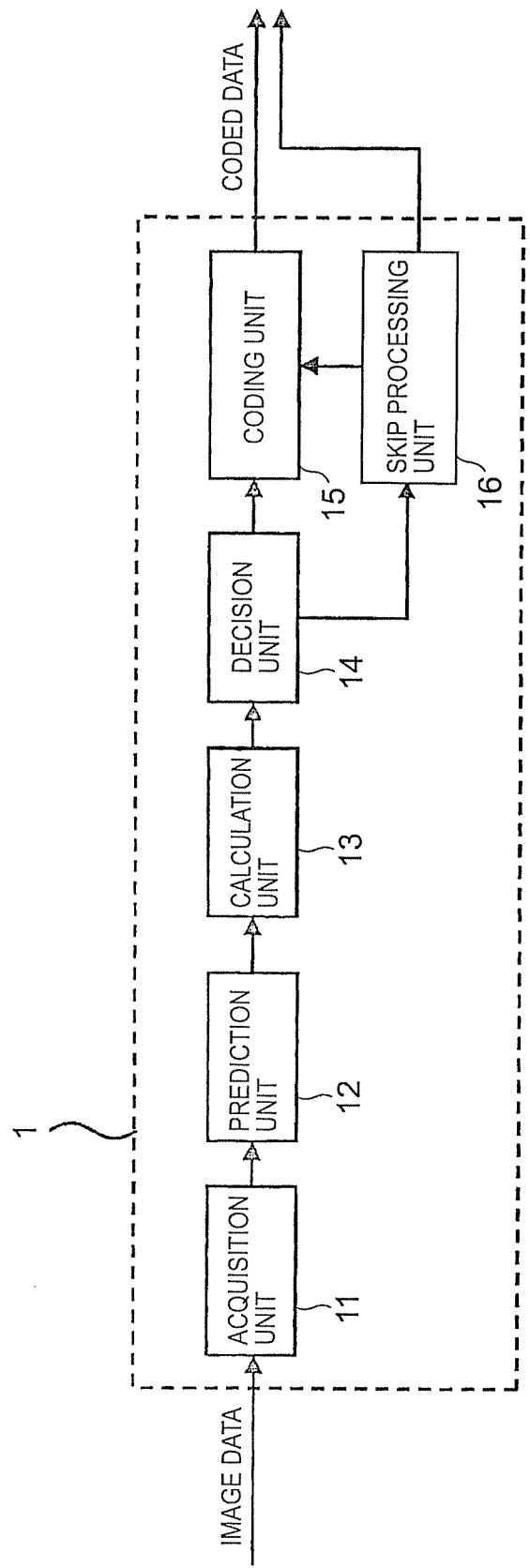
FIG. 1 is a block of an image coding apparatus 1 according to the first embodiment.

FIG. 1 is a block of the image coding apparatus 1. The image coding apparatus 1 includes an acquisition unit 11, a prediction unit 12, a calculation unit 13, a decision unit 14, a coding unit 15, and a skip processing unit 16.

The acquisition unit 11 acquires image data. Based on a reference block adjacent to a coding target block in the image data, the prediction unit 12 generates a prediction block of the coding target block. Moreover, the coding target block and the reference block respectively include pixels of which the number is a power of two.

The calculation unit 13 calculates a residual block as a difference between the coding target block and the prediction block.

Based on pixel values of the coding target block and pixel values of the reference block, the decision unit 14 decides whether to code the residual block by using variable length coding.

When the residual block is decided to be coded, the coding unit 15 codes pixel values of the residual block by using variable length coding.

When the residual block is not decided to be coded, the skip processing unit 16 codes the residual block as coding skip information, or counts up the number of skip blocks.

The acquisition unit 11, the prediction unit 12, the calculation unit 13, the decision unit 14 and the coding unit 15, may be realized by a CPU (Central Processing Unit) and a memory used thereby. Thus far, component of the image coding apparatus 1 is already explained.

Figure 2:
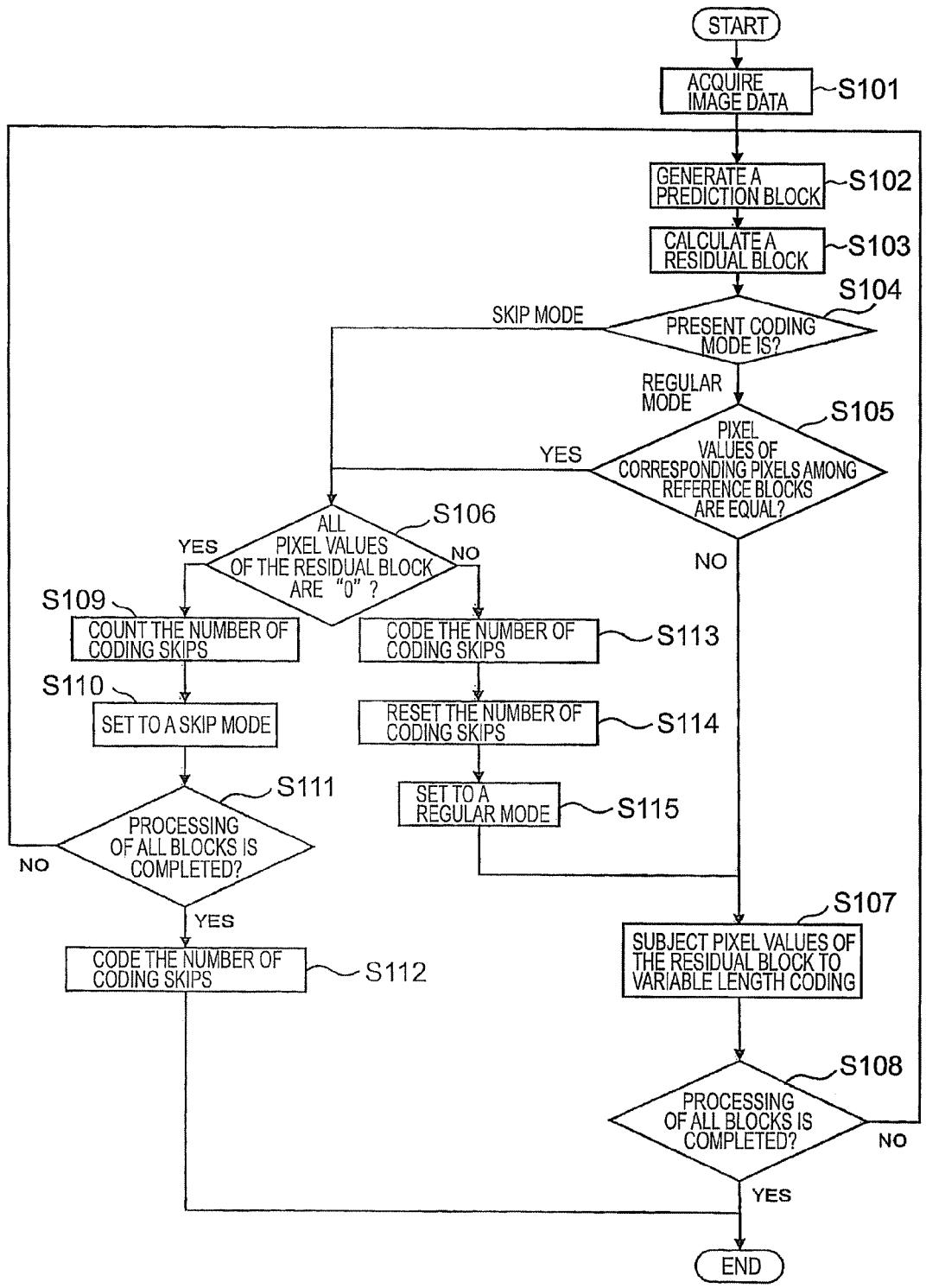
FIG. 2 is a flow chart of processing of the image coding apparatus 1.

FIG. 2 is a flow chart of processing of the image coding apparatus 1. In the first embodiment, as a coding mode, a skip mode and a regular mode are set. The skip mode is a mode to determine whether the coding target block is skipped from coding or the number of blocks skipped is counted up.

The regular mode is a mode to code the coding target block by using variable length coding without skip processing. Moreover, at a start timing of the flow chart in FIG. 2, the regular mode is already set. Hereinafter, each step of the flow chart will be explained.

The acquisition unit 11 acquires image data (S101). Based on a reference block adjacent to a coding target block, the prediction unit 12 generates a prediction block of the coding target block (S102).

The calculation unit 13 calculates a residual block as a difference between the coding target block and the prediction block (S103). The decision unit 14 decides whether the (present) coding mode is the skip mode or the regular mode (S104).

When the coding mode is the skip mode (Skip mode at S104), the decision unit 14 decides whether pixel values of all pixels included in the residual block are "0" (S106).

When the coding mode is the regular mode (Regular mode at S104), the decision unit 14 decides whether pixel values of corresponding pixels among reference blocks are equal (S105). When the pixel values are equal (Yes at S105), processing is transited to S106.

When the pixel values are not equal (No at S105), the coding unit 15 acquires coded data by subjecting pixel values of the residual block to variable length coding (S107). The coding unit 15 decides whether processing of all blocks is already completed (S108). When processing of all blocks is already completed (Yes at S108), the coding unit 15 outputs the coded data, and processing of the flow chart in FIG. 2 is completed. When processing of at least one block is not completed yet (No at S108), processing is transited to S102, and processing is continually executed for a next coding target block.

At S106, when pixel values of all pixels included in the residual block are "0" (Yes at S106), the skip processing unit 16 counts the number of coding target blocks (the number of coding skips) which has skipped coding (S109). If a coding target block is first skipped in the image, the skip processing unit 16 starts counting from "0". If at least one coding target block is already skipped in the image, the skip processing unit 16 adds "1" to the number of coding skips thereat.

The skip processing unit 16 sets the coding mode to the skip mode (S110). However, when the coding mode is already set to the skip mode, processing is transited to S111 without S110.

The skip processing unit 16 decides whether processing of all blocks is already completed (S111). When processing of all blocks is already completed (Yes at S111), the skip processing unit 16 generates coded data by coding the number of coding skips (S112), and processing of the flow chart in FIG. 2 is completed.

When processing of at least one block is not completed yet (No at S111), processing is transited to S102, and processing is continually executed for a next coding target block.

At S106, when a pixel value of at least one pixel included in the residual block is not "0" (No at S106), the skip processing unit 16 codes the number of coding skips (S113), and resets the number of coding skips (S114).

The skip processing unit 16 sets the coding mode to the regular mode (S115), and processing is transited to S107. However, when the coding mode is already set to the regular mode, processing is transited to S107 without S115. Thus far, processing of the image coding apparatus 1 is already explained.

Hereinafter, concrete examples of each processing of the image coding apparatus 1 is explained. In the first embodiment, the number of pixels included in each block is "16×1" pixels. However, the number of pixels therein is not limited to this.

FIG. 3 is a schematic diagram showing relationship between a coding target block and reference blocks thereof. At S102, as to a coding target block, for example, the prediction unit 12 generates a prediction block by using a reference block A (shifted one pixel to the left side from the coding target block), a reference block B (shifted one pixel to the upper side from the coding target block), and a reference block C (shifted one pixel to the upper and left side from the coding target block).

In the first embodiment, by using a prediction method called "plane prediction", the prediction block is generated from above-mentioned three reference blocks. By using three reference blocks A, B and C, plane prediction is calculated as an equation (A+B+C). Here, "A, B, C" represent pixel values of each reference block.

Here, as the prediction method of the prediction block, plane prediction is used. However, the prediction method is not limited to plane prediction. For example, if a prediction method "(A+B)/2" is used as DC prediction, only two reference blocks are necessary. Alternatively, if a pixel value A is used as prediction from a left pixel, only one reference block is necessary. As a result, an upper pixel line of the coding target block is not necessary to be read, and memory-access speed rises.

Figure 4:
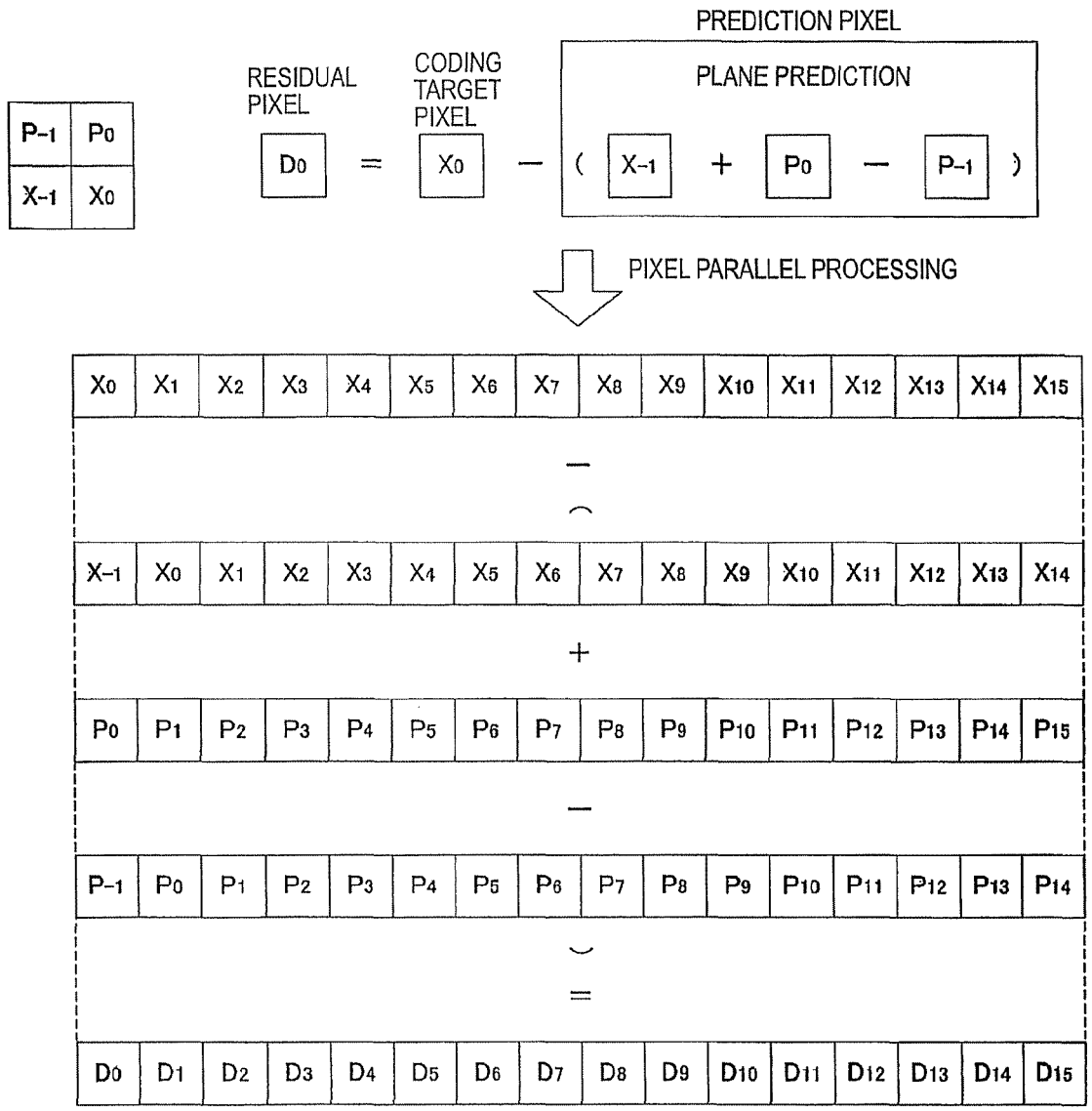
FIG. 4 is a schematic diagram showing one example of pixel prediction method (plane prediction).

FIG. 4 is a schematic diagram showing one example of pixel prediction method (plane prediction). At S103, the calculation unit 13 generates a residual block by calculating a difference between a coding target block and a prediction block. Here, quick processing can be realized by calculating "16×1" pixels simultaneously. As to this calculation, for example, SIMD instruction loaded onto the CPU can be used.

For example, if a signal length of an input pixel is eight bits, a data length of a pixel block is "16×8=128" bits, and a set of SIMD instruction called SSE2 (using 128 bits register) can be utilized. Furthermore, if a signal length is 16 bits, a register having 256 bits is necessary. Here, two registers each having 128 bits may be used.

At S104, the decision unit 14 decides whether the present coding mode is a skip mode or a regular mode.

At S105, the decision unit 14 compares pixel values of corresponding pixels among reference blocks A, B and C. For example, the decision unit 14 calculates differences "A−B" and "B−C" of pixel values, and decides whether a sum of absolute vales (|A−B|+|B−C|) is "0". This calculation can be quickly executed by using SIMD instruction.

Decision processing of S104 and S105 corresponds to decision whether a possibility of coding skip is high. If the present coding mode is a skip mode, a previous coding target block is already skipped. Accordingly, a possibility that skip processing continues is high.

If all pixel values of corresponding pixels among reference blocks (adjacent to the coding target block) are equal, a possibility that each pixel value of corresponding pixel of the coding target block is equal to those of the reference blocks is high.

By using information of the reference blocks without information of the coding target block, even if hint information (such as a skip flag to be coded) is not used for decoding, a possibility whether to skip coding can be decided. As a result, information such as "non-skip coding" need not be coded for each block, and effective coding can be performed.

At S106, the decision unit 14 decides by calculating a sum of absolute value of pixel values of the residual block. Even if a possibility to skip coding is high (Yes at S104 or S105), a residual may occur. Accordingly, this processing had better be performed.

When all pixel values of the residual block are "0" (Yes at S106), the skip processing unit 16 counts up the number of skip blocks (S109), and sets the coding mode to a skip mode (S110).

At S111, the skip processing unit 16 decides whether coding processing is executed for the end block of the image. As a processing unit, for example, all data of input image, each pixel line, or a specific slice (a plurality of pixel lines), may be used.

When coding processing is not executed for the end block yet, processing is transited to S102. When coding processing is already executed for the end block, processing is transited to S112 to code the number of coding skips, and coding processing is completed. A method for coding the number of coding skips (S112) will be explained afterwards.

When at least one pixel value of the residual block is non-zero (No at S106), the coding target block cannot be skipped. Accordingly, processing is transited to S113~S115 to set the coding mode to a regular mode.

At S113 to code the number of skip blocks, the number of blocks already skipped until the present time is coded. As coding of the number of skip blocks, two processing steps (S112 and S113) are included in FIG. 2. These steps may be the same processing method or two different methods.

At S112, information such as "all remained blocks are skipped" may be coded without coding the number of skip blocks. On the other hand, at S113, after at least one skip has continuously occurred, a residual block is coded. Accordingly, the number of skip blocks must be coded.

For example, if a first one bit is "0", all remained bits may be coded to represent blocks skipped coding. If the first one bit is "1", the number of skip blocks may be coded by fixed length coding or Golomb coding thereafter.

At S113~S115, the skip processing unit 16 codes the number of skip blocks (S113), resets the number of skip blocks to "0", and sets the coding mode to a regular mode (S115). Then, processing is transited to S107.

At S107, the coding unit 15 codes a pixel value (residual pixel value) of each pixel included in the residual block and ancillary information as explained afterwards. As a method for coding a residual pixel value, in the first embodiment, Golomb coding is used. However, another method may be used.

FIGS. 5A and 5B show examples of Golomb coding tables. Each Golomb code has a prefix length of eight bits. In FIGS. 5A and 5B, a value of parameter K to control a suffix length is different (K=0 in FIG. 5A, K=1 in FIG. 5B).

For example, when absolute vales of residual pixel vales of the residual block concentrate to small values, Golomb coding table of which K is a smaller value represents high compression. On the other hand, when absolute vales of residual pixel vales of the residual block concentrate to large values, Golomb coding table of which K is a larger value represents high compression.

For example, the coding unit 15 may determine a value of K based on a residual pixel value of the residual block, and code the value of K as above-mentioned ancillary information. As a result, at S107, a code of the value of K and a Golomb code of each residual pixel value are output as coded data.

Moreover, for example, if a value of K is "8" as a maximum, the coding unit 15 may code the value of K by fixed length coding of three bits. Furthermore, in the same way as the residual pixel value, the coding unit 15 may calculate a difference between the value and a previous value of K, and code the difference by assigning Golomb code.

As the coding method, except for Golomb coding, Huffman coding may be used. For example, the coding unit 15 may code a residual pixel value by using a code table (previously trained and designed). Furthermore, when a plurality of input images is continually coded, a code table may be designed again from a previous input image.

At S108, when processing of all blocks is already completed (Yes at S108), the coding unit 15 outputs coded data, and processing of the flow chart in FIG. 2 is completed. When processing of at least one block is not completed yet (No at S108), processing is transited to S102, and processing is continually performed for a next coding target block.

As to the first embodiment, while a plurality of pixels is processed in parallel, whether to skip coding of each pixel is decided. Accordingly, image coding can be quickly and effectively performed.

The Second Embodiment

As to an image coding apparatus 2 of the second embodiment, a plurality of prediction blocks is generated for a coding target block by different prediction methods, and a suitable prediction method to raise compression efficiency thereof is selected. This feature is different from the image coding apparatus 1.

Figure 6:
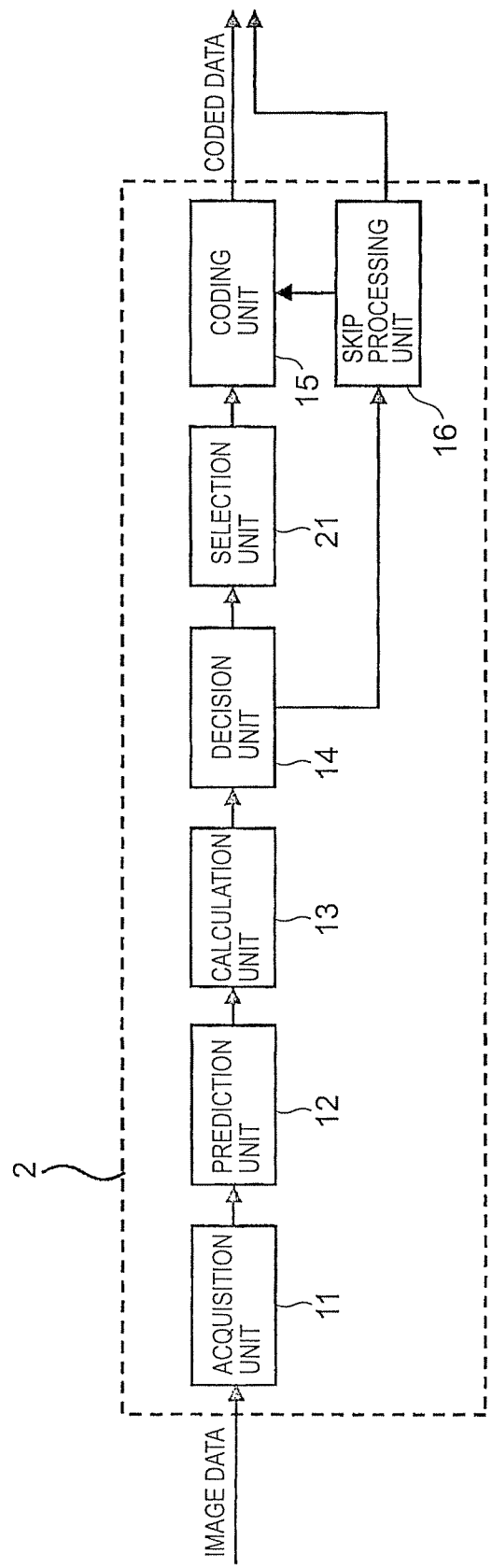
FIG. 6 is a block of an image coding apparatus 2 according to the second embodiment.

FIG. 6 is a block diagram of the image coding apparatus 2. In comparison with the image coding apparatus 1, the image coding apparatus 2 includes a selection unit 21.

Among prediction blocks generated by a plurality of prediction methods, the selection unit 21 selects the most suitable prediction method.

Figure 7:
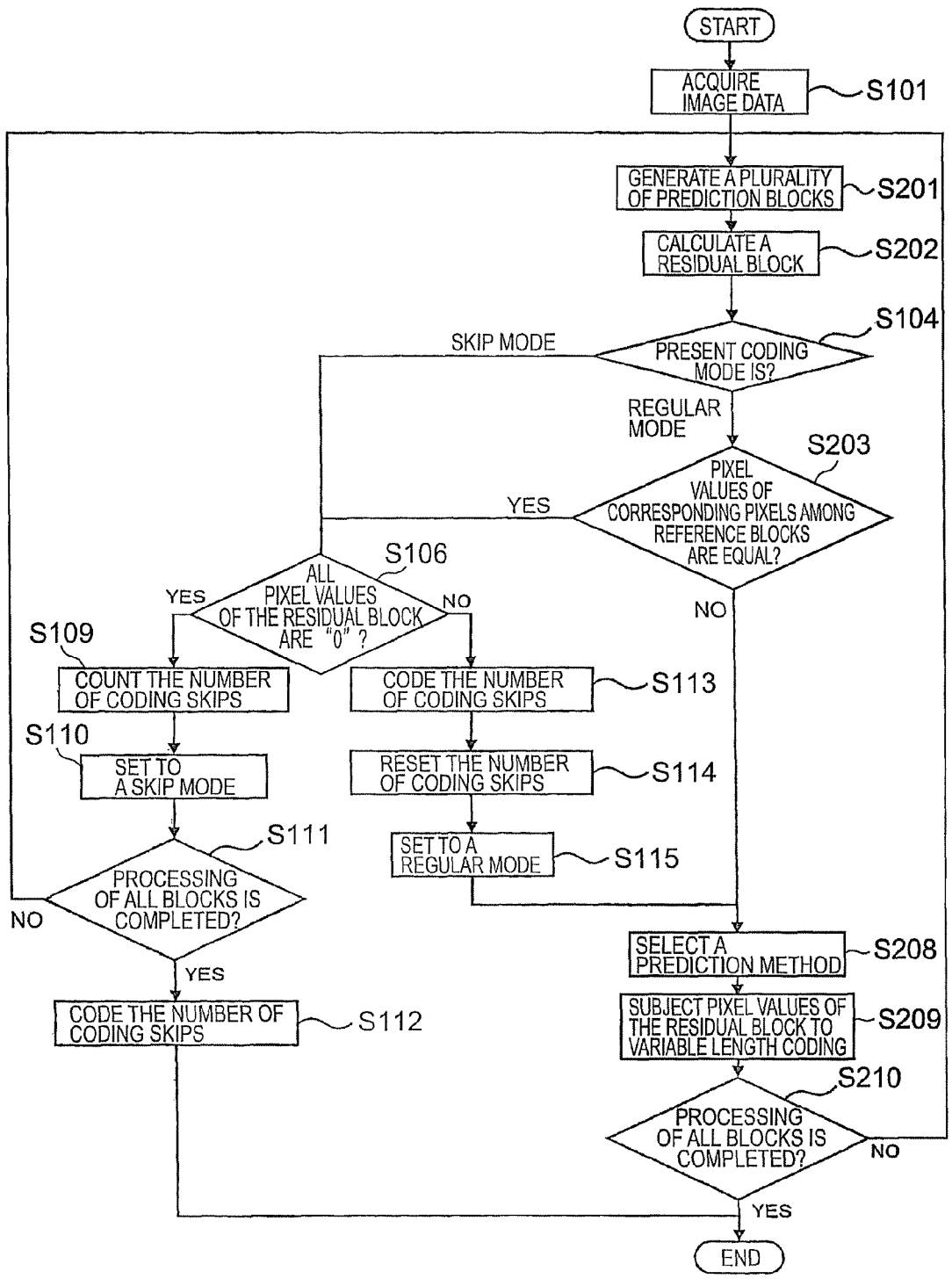
FIG. 7 is a flow chart of processing of the image coding apparatus 2.

FIG. 7 is a flow chart of processing of the image coding apparatus 2. A point different from the image coding apparatus 1 will be only explained.

At S201, the prediction unit 12 generates a plurality of prediction blocks by using different prediction methods (S201). In the second embodiment, as the plurality of prediction methods, three prediction methods, i.e., plane prediction, prediction from left pixel, prediction from upper pixel, are explained. However, the plurality of prediction methods is not limited to this.

Briefly, the prediction unit 12 calculates (A+B−C) as plane prediction. The prediction unit 12 uses A as prediction from left pixel and uses B as prediction from upper pixel.

At S202, the calculation unit 13 generates a residual block for each prediction block (S202). A method from generating the residual block is same as that of the image coding apparatus 1.

At S203, the decision unit 14 decides whether pixel values of corresponding pixels among prediction blocks are equal (S203). For example, by calculating "A=B=(A+B−C)", the decision unit 14 may decide whether pixel values of corresponding pixels among prediction blocks are equal.

In the second embodiment, a plurality of prediction methods is used. Accordingly, when a prediction block is different for each skipped block, in addition to information of coding skip, information of the prediction method must be coded. As a result, coding skip cannot be effectively performed.

However, if the prediction block of each skipped block is same, any prediction method can be used. Accordingly, in addition to information of coding skip, information of the prediction method need not be coded.

At S208, from a plurality of prediction block, the selection unit 21 selects a prediction block generated by a prediction method of which compression efficiency is the highest (S208). For example, when a residual block is coded by Golomb coding, in order to select a prediction method of which compression efficiency is the highest, the selection unit 21 calculates a sum of absolute value of pixel values of the residual block by each prediction method, and selects a prediction method by which the sum is the smallest.

When another coding method is used, the selection unit 21 had better select a prediction method by which a coding amount (For example, a sum of coding length of each pixel value by Huffman coding) of pixel values of the residual block is the smallest.

At S209, the coding unit 15 generates coded data by subjecting the residual block to variable length coding (S209). A method for coding the residual block may be same as that of the image coding apparatus 1. In the second embodiment, the coding unit 15 codes information of the selected prediction method as ancillary information.

As to the second embodiment, by selecting the most suitable prediction method, compression efficiency rises. Furthermore, while a plurality of pixels is processed in parallel, whether to skip coding of each pixel is decided. Accordingly, image coding can be quickly and effectively performed.

The Third Embodiment

As to an image coding apparatus 3 of the third embodiment, image data acquired is previously quantized. This feature is different from the first and second embodiments.

Figure 8:
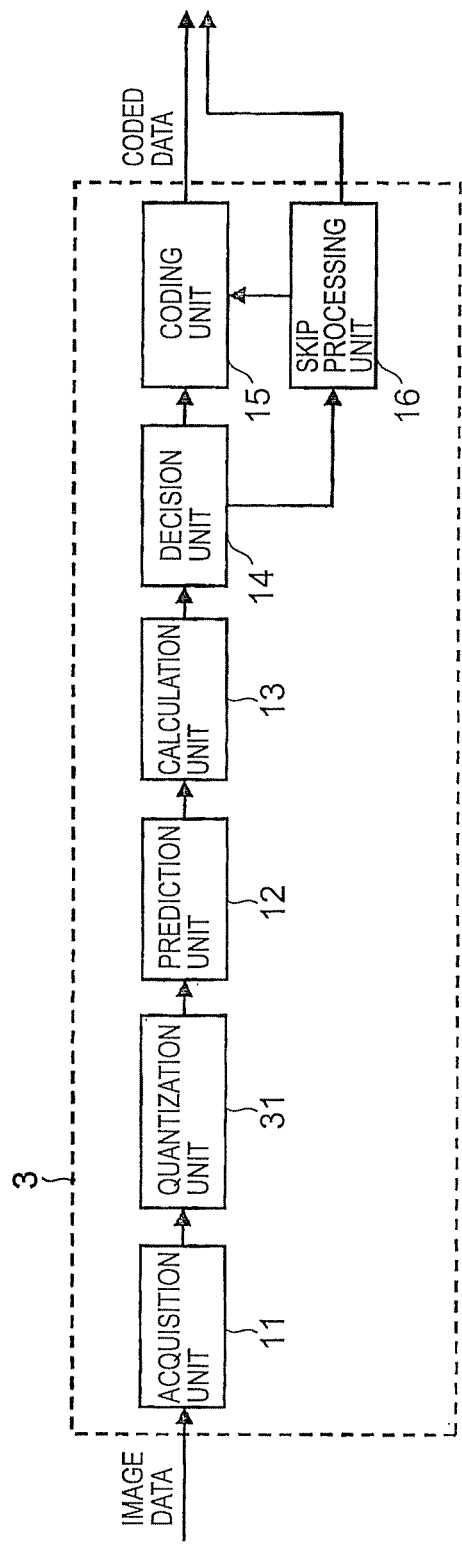
FIG. 8 is a block of an image coding apparatus 3 according to the third embodiment.

FIG. 8 is a block diagram of the image coding apparatus 3. In comparison with the image coding apparatus 1, the image coding apparatus 3 includes a quantization unit 31.

The quantization unit 31 quantizes pixel values of image data acquired (input image data). For example, the quantization unit 31 may execute linear quantization or non-linear quantization. Moreover, an equation (1) is used for linear quantization.

$$\text{pixel value quantized} = \frac{(\text{input pixel value}) + \frac{(\text{quantization level})}{2}}{\text{quantization level}} \quad (1)$$

In the equation (1), the input pixel value is a pixel value of each pixel in the input image data. For example, if a quantization level is "2" and a signal length of the input image data is eight bits, a signal length is reduced to seven bits after quantization. As a result, data amount to be coded can be reduced.

In the third embodiment, as mentioned-above, by quantizing input image data previously, a size of compressed data can be smaller than a size of quantized data.

Furthermore, in the third embodiment, linear quantization is used as a quantization method. However, for example, non-linear quantization may be used so as to make a quantization level be smaller when an input pixel value is small and make the quantization level be larger when the input pixel value is large. By using non-linear quantization, image quality can be improved.

Moreover, in the third embodiment, an example that the quantization unit 31 is added to the image coding apparatus 1 is explained. The quantization unit 31 may be added to the image coding apparatus 2.

Furthermore, in the third embodiment, by adding quantization information (by the quantization unit 31) to coded data, the decoder side performs inverse quantization processing. However, for example, as to an input having eight bits, a low-order one bit thereof may be previously quantized to generate the input having seven bits. In this case, quantization information need not be added to coded data.

As to the third embodiment, a size of coded data can be previously determined. Then, while a plurality of pixels is processed in parallel, whether to skip coding of each pixel is decided. Accordingly, image coding can be quickly and effectively performed.

The Fourth Embodiment

An image coding apparatus of the fourth embodiment generates a prediction block of a coding target block, and decides whether to code a residual block between the coding target block and the prediction block by using variable length coding, based on information calculated to generate the prediction block. Furthermore, the image coding apparatus 4 codes the number of blocks skipped for coding and the number of residual blocks coded by using variable length coding. As a result, coding efficiency can be improved.

Figure 9:
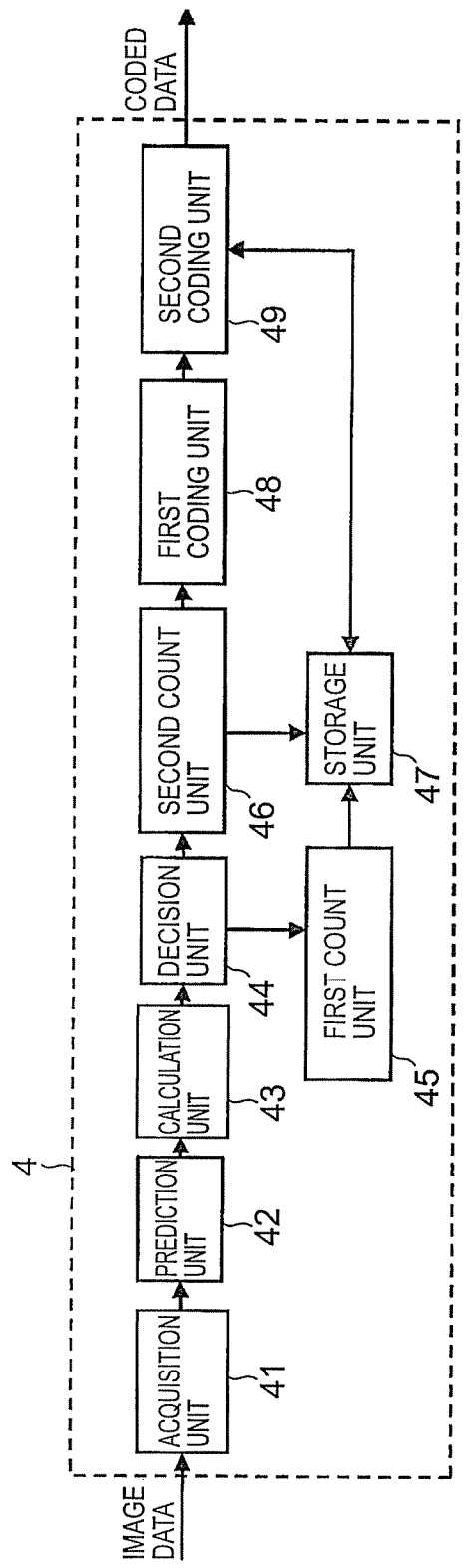
FIG. 9 is a block of an image coding apparatus 4 according to the fourth embodiment.

FIG. 9 is a block diagram of the image coding apparatus 4. The image coding apparatus 4 includes an acquisition unit 41, a prediction unit 42, a calculation unit 43, a decision unit 44, a first count unit 45, a second count unit 46, a storage unit 47, a first coding unit 48, and a second coding unit 49.

The acquisition unit 41 acquires image data. Based on a reference block adjacent to the coding target block in the image data, the prediction unit 42 generates a prediction block of the coding target block. Moreover, the coding target block and the reference block respectively include pixels of which the number is a power of two.

The calculation unit 43 calculates a residual block as a difference between the coding target block and the prediction block.

Based on pixel values of the coding target block and pixel values of the reference block, the decision unit 44 decides whether to code the residual block by using variable length coding.

When the residual block is not coded by using variable length coding, the first count unit 45 counts the number of coding skips. The first count unit 45 writes the number of coding skips into the storage unit 47.

When the residual block is coded by using variable length coding, the second count unit 46 counts the number of coding target blocks coded by using variable length coding (the number of blocks coded by using variable length coding). The second count unit 46 writes the number of variable length blocks into the storage unit 47.

The first coding unit 48 codes pixel values of the residual block by variable length coding. The second coding unit 49 codes the number of coding skips and the number of variable length blocks, and outputs coded data thereof unified with coded residual block.

The acquisition unit 41, the prediction unit 42, the calculation unit 43, the decision unit 44, the first count unit 45, the second count unit 46, the first coding unit 48 and the second coding unit 49, may be realized by a CPU (Central Processing Unit) and a memory used thereby. The storage unit 47 may be realized by the memory or an auxiliary memory. Thus far, processing of the image coding apparatus 4 is already explained.

Figure 10:
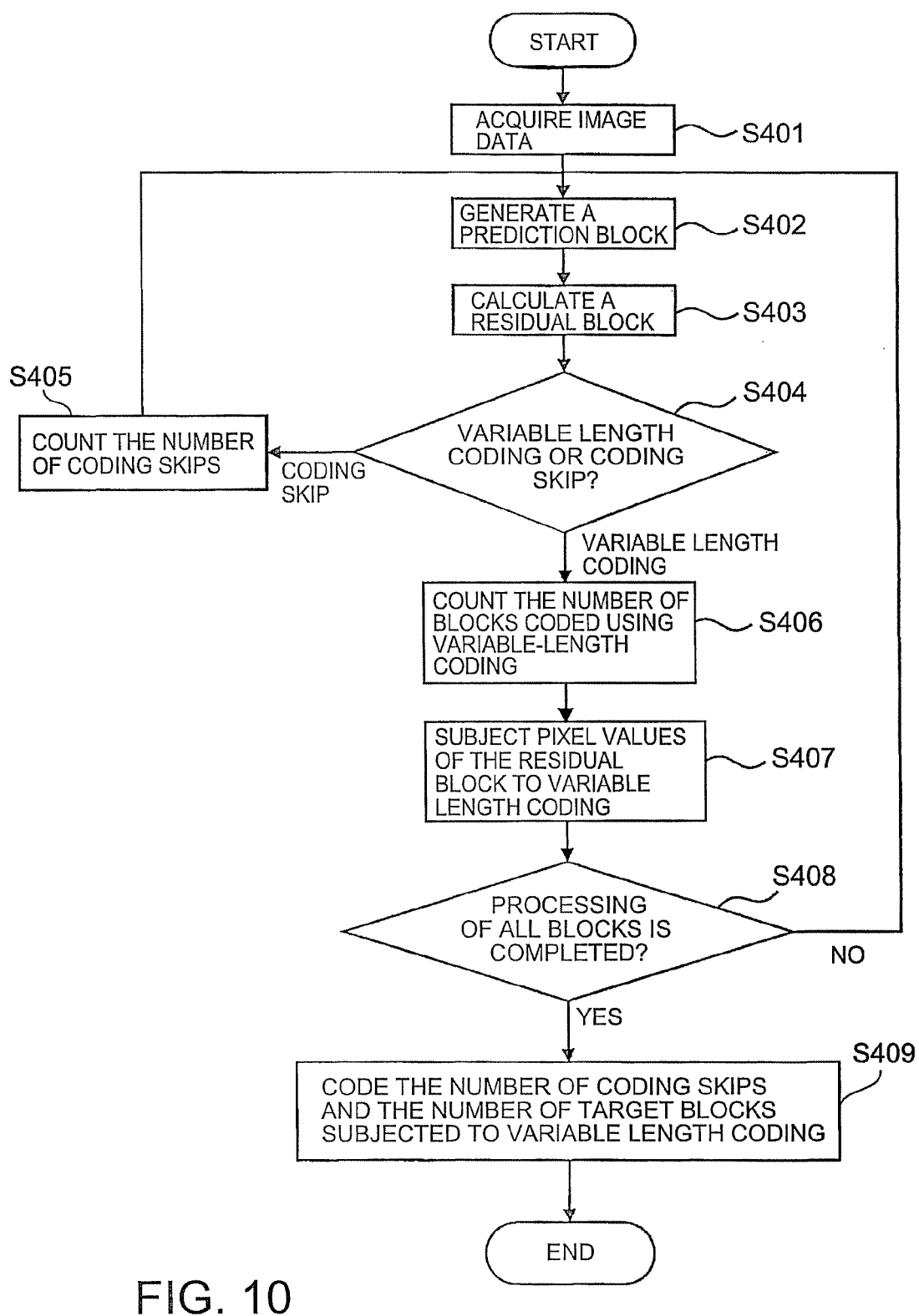
FIG. 10 is a flow chart of processing of the image coding apparatus 4.

FIG. 10 is a flow chart of processing of the image coding apparatus 4. The acquisition unit 41 acquires image data (S401). Based on a reference block adjacent to the coding target block in the image data, the prediction unit 42 generates a prediction block of the coding target block (S402). The calculation unit 43 calculates a residual block as a difference between the coding target block and the prediction block (S403).

Based on pixel values of the coding target block and pixel values of the reference block, the decision unit 44 decides whether to code the residual block by using variable length coding (S404).

When the residual block is not coded by using variable length coding (No at S404), the first count unit 45 counts the number of coding skips (S405). The first count unit 45 writes the number of coding skips into the storage unit 47. Processing is transited to S402, and a next coding target block is processed.

When the residual block is coded by using variable length coding (Yes at S404), the second count unit 46 counts the number of variable length blocks (S406). The second count unit 46 writes the number of variable length blocks into the storage unit 47.

The first coding unit 48 codes pixel values of the residual block by variable length coding (S407). The first coding unit 48 decides whether processing of all blocks is already completed (S408). When processing of at least one block is not completed yet (No at S408), processing is transited to S402, and a next coding target block is continually processed.

When processing of all blocks is already completed (Yes at S408), the second coding unit 49 reads the number of coding skips and the number of variable length blocks from the storage unit 47. The second coding unit 49 codes the number of coding skips and the number of variable length blocks, and outputs coded data thereof unified with the residual block (coded by the first coding unit 48). After that, processing is completed. Thus far, processing of the image coding apparatus 4 is already explained.

Hereinafter, concrete examples of each processing of the image coding apparatus 4 will be explained. Processing of S401~S403 and S407 may be same as that of the first and second embodiments.

At S404, the decision unit 44 decides whether a sum of absolute values of pixel values of all pixels included in the residual block is equal to "0". When the sum is equal to "0", processing is transited to S405. When the sum is not equal to "0", processing is transited to S406.

If a plurality of prediction blocks is generated by using a plurality of prediction methods, a plurality of residual blocks is generated. In this case, for example, the decision unit 44 may decide whether a sum of absolute values of all pixel values included in the plurality of residual blocks is equal to "0". Alternatively, the decision unit 44 may decide whether a sum of absolute values of all pixel values included in at least one residual block is equal to "0".

Figure 11:
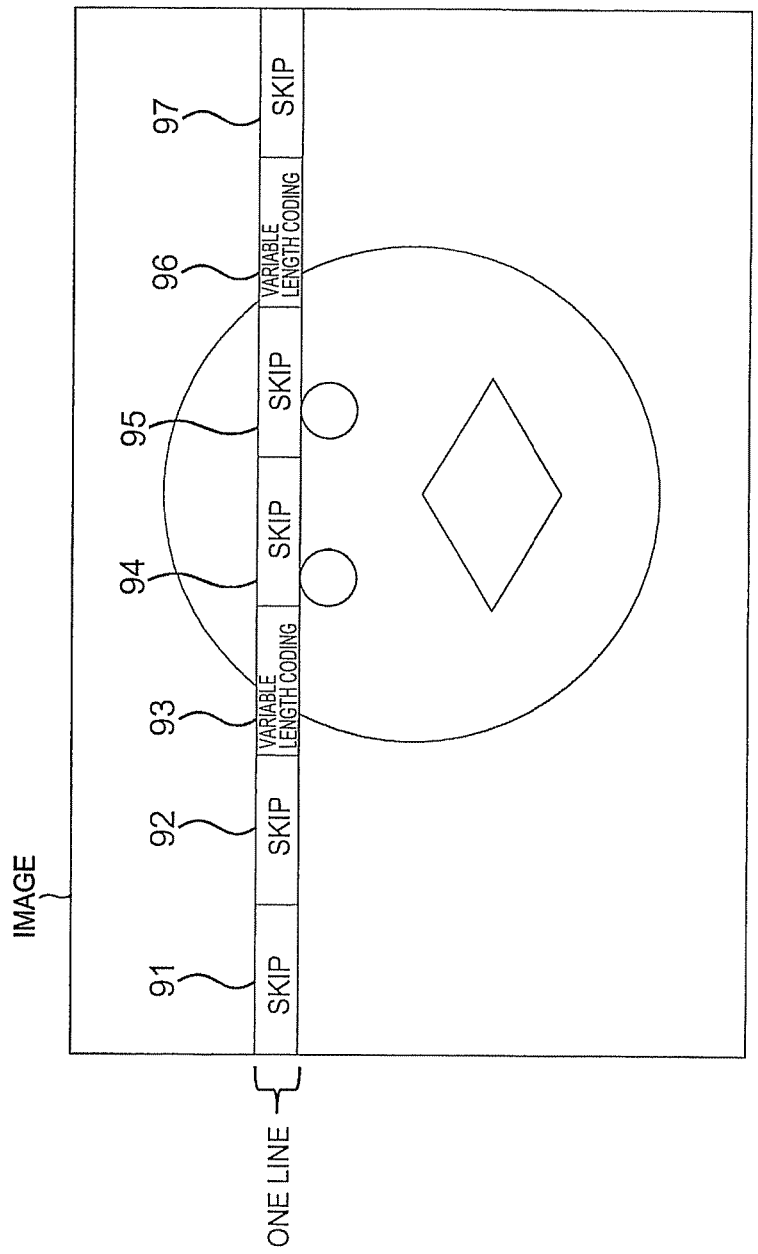
FIG. 11 is a schematic diagram showing the number of coding skips and the number of target blocks to be coded.

FIG. 11 is a schematic diagram showing the number of coding skips and the number of variable length blocks. In FIG. 11, an image represents a line drawing, and all pixel values of a flat part except for the line drawing are equal. Furthermore, a processing unit in the flow chart of FIG. 10 is one line in the image.

In FIG. 11, a coding target block 91 is a flat part in the image, and all pixel values therein are equal. Accordingly, a sum of absolute values of pixel values included in a residual block thereof is "0", and decision at S404 is "coding skip". At S405, the first count unit 45 counts up the number of coding skips from "0" to "1", and writes the counted number into the storage unit 47.

A coding target block 92 is also a flat part in the image, and all pixel values therein are equal. Accordingly, a sum of absolute values of pixel values included in a residual block thereof is "0", and decision at S404 is "coding skip". At S405, the first count unit 45 counts up the number of coding skips from "1" to "2", and writes the counted number into the storage unit 47.

A coding target block 93 includes a line of the line drawing in the image. Accordingly, a sum of absolute values of pixel values included in a residual block thereof is not "0", and decision at S404 is "variable length coding". At S406, the second count unit 46 counts up the number of variable length blocks from "0" to "1", and writes the counted number into the storage unit 47.

A coding target block 94 is a flat part in the image, and all pixel values therein are equal. Accordingly, a sum of absolute values of pixel values included in a residual block thereof is "0", and decision at S404 is "coding skip". At S405, the first count unit 45 counts up the number of coding skips from "0" to "1", and writes the counted number into the storage unit 47.

Here, while the number of coding skips counted till then is maintained in the storage unit 47, the first count unit 45 writes the number of coding skips newly counted from "0" into another area of the storage unit 47. Same processing is performed for coding target blocks 95~97.

Briefly, in an example of the image of FIG. 11, the storage unit 47 stores the number of coding skips and the number of variable length blocks each counted, such as the number of coding skips "2", the number of variable length blocks "1", the number of coding skips "2", the number of variable length blocks "1", and the number of coding skips "1".

At S407, the first coding unit 48 codes the residual block decided as "variable length coding" (at S404) by variable length coding. The second coding unit 49 outputs coded data that the number of coding skips and the number of variable length blocks are unified with the residual block (coded by the first coding unit 48).

Figure 12:
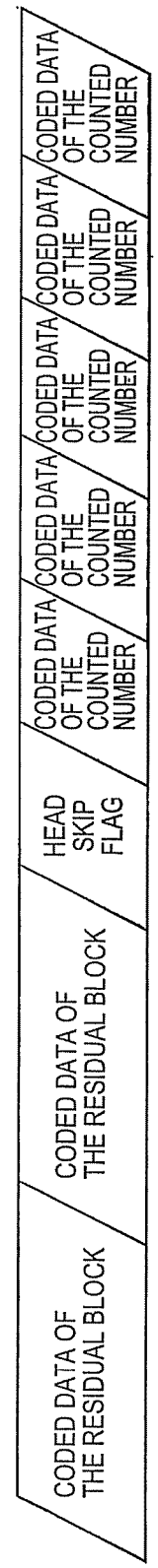
FIG. 12 is a schematic diagram showing one example of coded data outputted by the image coding apparatus 4.

FIG. 12 is a schematic diagram showing one example of coded data outputted by the image coding apparatus 4. As shown in FIG. 12, output data includes coded data of each residual block and coded data of each counted number added thereto. Here, "head skip flag" represents that coded data of each counted number is added hereafter.

At S409, the second coding unit 49 codes the number of coding skips and the number of variable length blocks (stored in the storage unit 47). For example, the second coding unit 49 may utilize Golomb coding in the same way as the first embodiment.

Furthermore, order of type of "count" stored in the storage unit 47 is mutually repeated as "the number of coding skips"→"the number of variable length blocks"→"the number of coding skips"→ . . . . Accordingly, the second coding unit 49 had better add one bit flag to the coded data, so that the one bit flag represents whether a type of "count" to be first counted is "the number of coding skips" or "the number of variable length blocks".

As a result, the decoding side can automatically decide that each counted number is "the number of coding skips" or "the number of variable length blocks". In this way, by collectively coding "the number of coding skips" and "the number of variable length blocks", a skip flag to be added to each block is unnecessary, and coding efficiency can rise.

As to the fourth embodiment, while a plurality of pixels is processed in parallel, whether to skip coding of each block is decided. Accordingly, image coding can be quickly and effectively performed.

The Fifth Embodiment

Figure 13:
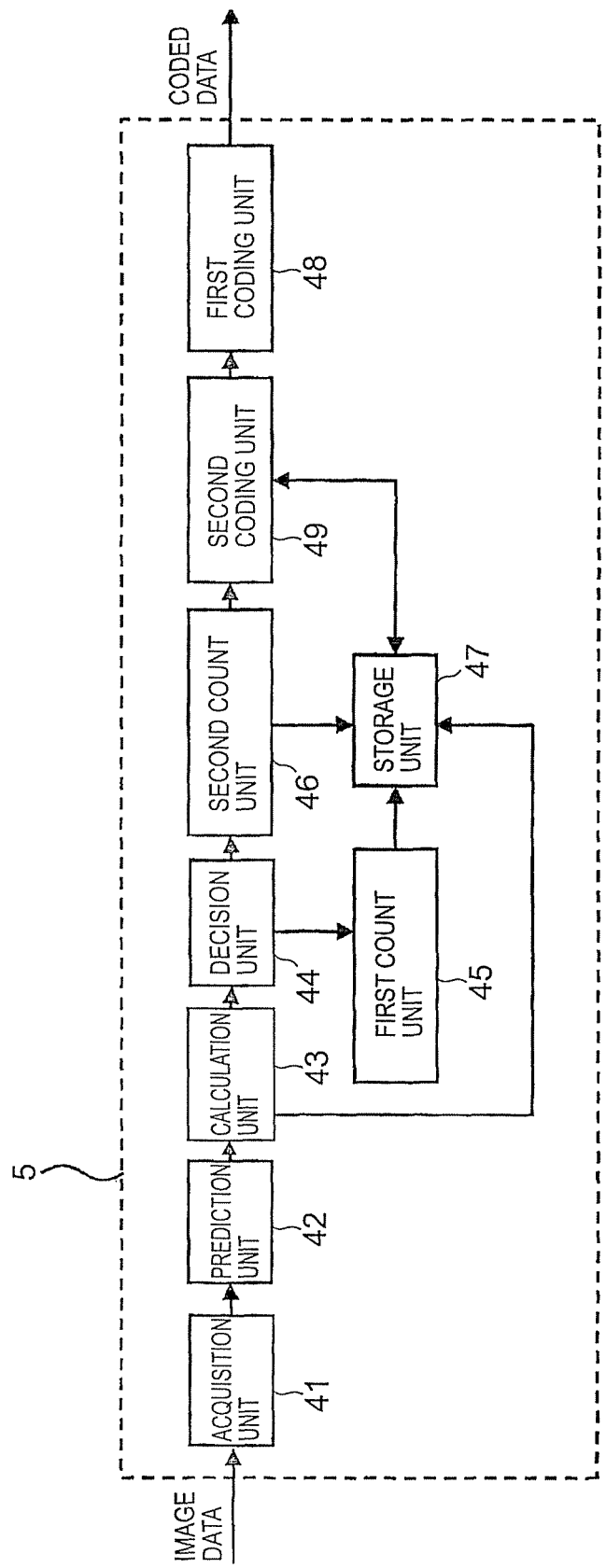
FIG. 13 is a block of an image coding apparatus 5 according to the fifth embodiment.

FIG. 13 is a block diagram of an image coding apparatus 5 of the fifth embodiment. In the image coding apparatus 5, the first coding unit 48 and the second coding unit 49 are connected in the opposite direction in comparison with the image coding apparatus 4.

Figure 14:
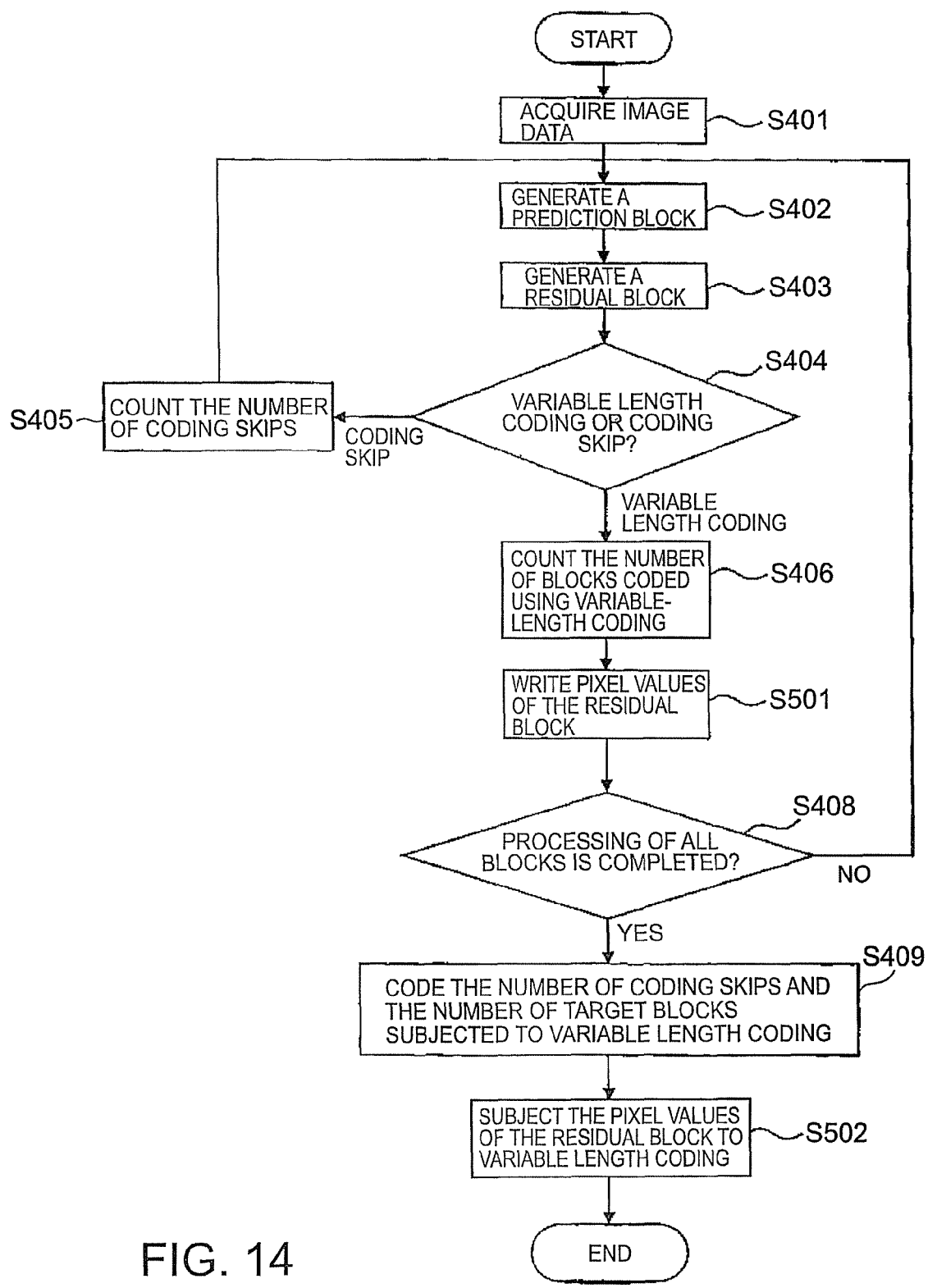
FIG. 14 is a flow chart of processing of the image coding apparatus 5.

FIG. 14 is a flow chart of processing of the image coding apparatus 5. In FIG. 14, processing of S401~S406, S408 and S409 is same as those in FIG. 10 of the image coding apparatus 4.

At S501, the calculation unit 43 writes pixel values of pixels included in the residual block into the storage unit 47 (S501). Moreover, the calculation unit 43 may write the pixel value thereof into another storage unit (not shown in FIG. 13) different from the storage unit 47.

At S502, the second coding unit 49 codes pixel values of pixels included in the residual block (stored in the storage unit 47) by variable length coding, and generates coded data.

Figure 15:
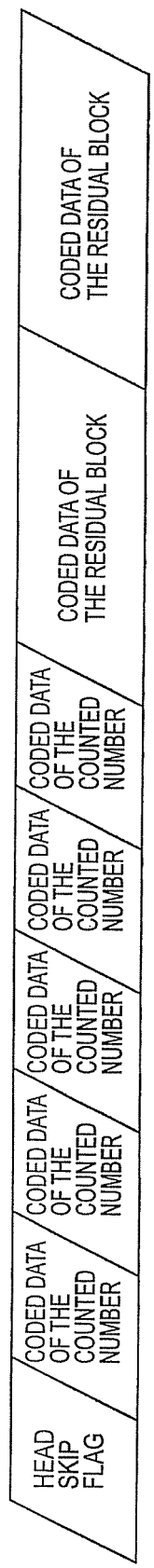
FIG. 15 is a schematic diagram showing one example of coded data outputted by the image coding apparatus 5.

FIG. 15 is a schematic diagram showing one example of coded data outputted by the image coding apparatus 5. As shown in FIG. 15, coded data output by the image coding apparatus 5 includes counted data (the number of coding skips, the number of variable length blocks) at the head side than coded data of the residual block.

By this data structure, the decoding side can process the coded data in order from the head side. As a result, the decoding side can easily execute decode processing.

Moreover, in the fifth embodiment, pixel values of the residual block are written into the storage unit 47. However, for example, after pixel data of the residual block is coded in the same way as the image coding apparatus 4, the image coding apparatus 5 may store coded data thereof. Then, after the counted number is coded, the image coding apparatus 5 may output coded data (of pixel data of the residual block) stored.

The Sixth Embodiment

In an image coding apparatus 6 of the sixth embodiment, except for calculation of the residual block by the calculation unit 43, an initial residual block used for the decision unit 44 to decide whether to skip coding is generated. This feature is different from the image coding apparatus 4. Furthermore, the image coding apparatus 6 generates the initial residual block by using a prediction method different from the method used for the residual block.

Figure 16:
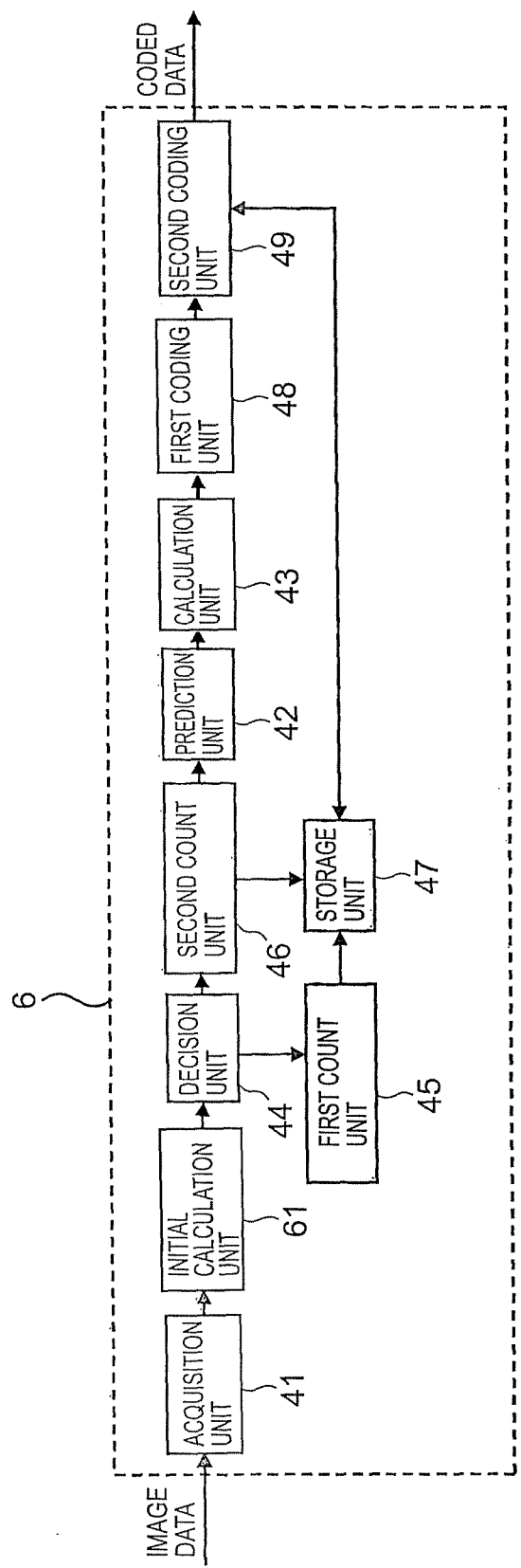
FIG. 16 is a block of an image coding apparatus 6 according to the sixth embodiment.

FIG. 16 is a block diagram of the image coding apparatus 6. In comparison with the image coding apparatus 4, the image coding apparatus 4 further includes an initial calculation unit 61 to calculate the initial residual block. Furthermore, connection relationship among each unit is different from that of the image coding apparatus 4.

Figure 17:
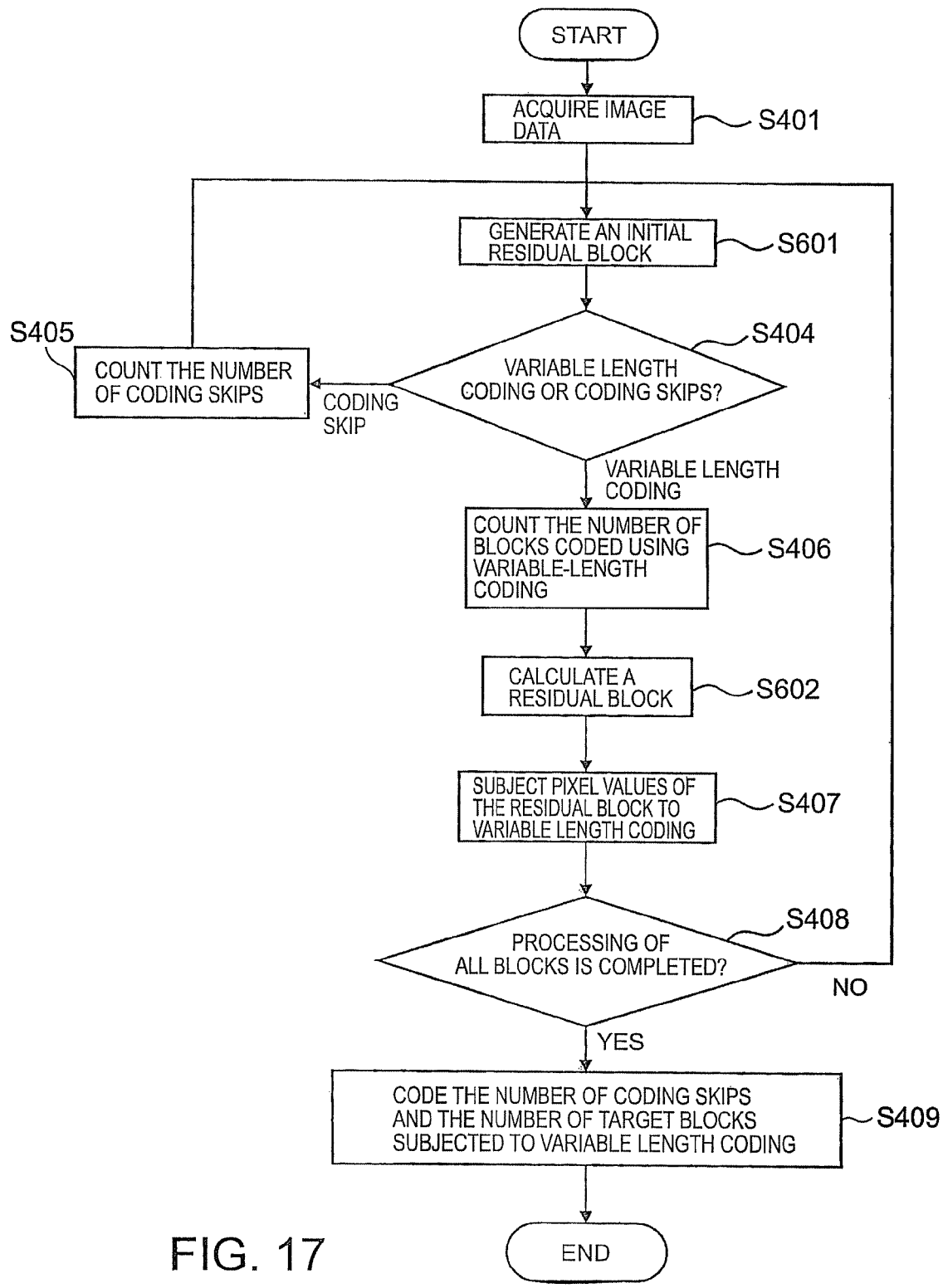
FIG. 17 is a flow chart of processing of the image coding apparatus 6.

FIG. 17 is a flow chart of processing of the image coding apparatus 6. At S601, the initial calculation unit 61 calculates an initial residual block in image data acquired (S601). In the sixth embodiment, from a difference between a coding target block and a block starting from a left pixel of the coding target block, the initial residual block is generated.

Moreover, in the sixth embodiment, lossless coding is performed. Accordingly, a principle of causation of coding/encoding need not be satisfied, and the coding target block and the block starting from a left pixel thereof may overlap. For example, when the sixth embodiment is applied to lossy coding, a residual block between adjacent pixels may be calculated from an upper pixel line not including the coding target block so as to satisfy the principle of causation.

At 602, the calculation unit 43 may calculate the residual block in the same way as processing of S403. Other steps are same as those of the image coding apparatus 4.

As to above-mentioned embodiments, coding can be quickly and effectively performed.

In the disclosed embodiments, the processing can be performed by a computer program stored in a computer-readable medium.

In the embodiments, the computer readable medium may be, for example, a magnetic disk, a flexible disk, a hard disk, an optical disk (e.g., CD-ROM, CD-R, DVD), an optical magnetic disk (e.g., MD). However, any computer readable medium, which is configured to store a computer program for causing a computer to perform the processing described above, may be used.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

While certain embodiments have been described, these embodiments have been presented by way of examples only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus for coding a coding target block in an input image, comprising:
    a prediction unit, realized by a computer processor to execute programs stored on a memory device, configured to acquire the input image, and generate a prediction block to be used for prediction of the coding target block based on at least one reference block in the input image, each number of pixels in the coding target block and the prediction block being a power of two, the at least one reference block including at least one pixel included in the coding target block;
    a calculation unit, realized by the computer processor, configured to calculate a residual block having residual pixel values between the coding target block and the prediction block;
    a decision unit, realized by the computer processor, configured to decide whether to code the residual block, based on pixel values of at least one of the coding target block, the reference block and the prediction block;
    a coding unit, realized by the computer processor, configured to code the residual block; and
    a skip processing unit, realized by the computer processor, configured to count up the number of residual blocks not being continuously coded,
    wherein
    the at least one reference block is a plurality of reference blocks adjacent to the coding target block in the input image,
    the decision unit decides not to code the residual block when pixel values of corresponding pixels among the plurality of reference blocks are equal and when a sum of absolute values of pixel values of the residual block is equal to "0", and decides to code the residual block when pixel values of corresponding pixels among the plurality of reference blocks are not equal or when a sum of absolute values of pixel values of the residual block is not equal to "0",
    the skip processing unit counts up the number of residual blocks when a sum of pixel values of the residual block absolute values is equal to "0", and codes the number of residual blocks which is counted up,
    the coding unit codes the residual block by variable length coding when the residual block is decided to be coded, and codes the number of residual blocks when a sum of absolute values of pixel values of the residual block is not equal to "0".

2. The apparatus according to claim 1, further comprising:
    a first count unit, realized by the computer processor, configured to count the number of residual blocks to skip coding; and
    a second count unit, realized by the computer processor, configured to count the number of residual blocks to code by variable length coding;
    wherein the coding unit respectively codes the number of residual blocks to skip coding and the number of residual blocks to code by variable length coding.

3. The apparatus according to claim 2, wherein
    the coding unit outputs in order, a plurality of coded data of the residual block by variable length coding, and a plurality of coded data of the number of residual blocks,
    the plurality of coded data of the number of residual blocks includes coded data of the number of residual blocks to skip coding and coded data of the number of residual blocks to code by variable length coding, mutually aligned in correspondence with each block in the input image.

4. The apparatus according to claim 2, wherein
    the coding unit outputs in order, a plurality of coded data of the number of residual blocks, and a plurality of coded data of the residual block by variable length coding,
    the plurality of coded data of the number of residual blocks includes coded data of the number of residual blocks to skip coding and coded data of the number of residual blocks to code by variable length coding, mutually aligned in correspondence with each block in the input image.

5. The apparatus according to claim 2, further comprising:
    an initial calculation unit, realized by the computer processor, configured to calculate an initial residual block including residual pixel values of corresponding pixels between the coding target block and a block starting a pixel adjacent to the coding target block in the input image;
    wherein the decision unit decides whether to code the residual block, based on a sum of absolute values of the residual pixel values of the initial residual block.

6. The apparatus according to claim 1, wherein
    the prediction unit generates a plurality of prediction blocks,
    the decision unit decides not to code the residual block when pixel values of corresponding pixels among the plurality of prediction blocks are equal, and decides to code the residual block when pixel values of corresponding pixels among the plurality of prediction blocks are not equal.

7. The apparatus according to claim 1, further comprising:
    a quantization unit, realized by the computer processor, configured to quantize the input image;
    wherein the prediction unit accepts quantized pixel values of each block of the quantized image from the quantization unit.

8. A method for coding a coding target block in an input image, comprising:
    acquiring the input image;
    generating a prediction block to be used for prediction of the coding target block based on at least one reference block in the input image, each number of pixels in the coding target block and the prediction block being a power of two, the at least one reference block including at least one pixel included in the coding target block;
    calculating a residual block having residual pixel values between the coding target block and the prediction block;
    deciding whether to code the residual block, based on pixel values of at least one of the coding target block, the reference block and the prediction block;
    coding the residual block; and
    counting up the number of residual blocks not being continuously coded,
    wherein
    the at least one reference block is a plurality of reference blocks adjacent to the coding target block in the input image, the deciding includes deciding not to code the residual block when pixel values of corresponding pixels among the plurality of reference blocks are equal and when a sum of absolute values of pixel values of the residual block is equal to "0", and deciding to code the residual block when pixel values of corresponding pixels among the plurality of reference blocks are not equal or when a sum of absolute values of pixel values of the residual block is not equal to "0", the counting includes counting up the number of residual blocks when a sum of absolute values of pixel values of the residual block is equal to "0", and coding the number of residual blocks which is counted up, the coding includes coding the residual block by variable length coding when the residual block is decided to be coded, and coding the number of residual blocks when a sum of absolute values of pixel values of the residual block is not equal to "0".

9. The method according to claim 8, further comprising:
counting the number of residual blocks to skip coding; and
counting the number of residual blocks to code by variable length coding;
wherein the coding includes respectively coding the number of residual blocks to skip coding and the number of residual blocks to code by variable length coding.

10. The method according to claim 9, further comprising:
outputting in order, a plurality of coded data of the residual block by variable length coding, and a plurality of coded data of the number of residual blocks;
wherein the plurality of coded data of the number of residual blocks includes coded data of the number of residual blocks to skip coding and coded data of the number of residual blocks to code by variable length coding, mutually aligned in correspondence with each block in the input image.

11. The method according to claim 9, further comprising:
outputting in order, a plurality of coded data of the number of residual blocks, and a plurality of coded data of the residual block by variable length coding,
wherein the plurality of coded data of the number of residual blocks includes coded data of the number of residual blocks to skip coding and coded data of the number of residual blocks to code by variable length coding, mutually aligned in correspondence with each block in the input image.

12. The method according to claim 9, further comprising:
calculating an initial residual block including residual pixel values of corresponding pixels between the coding target block and a block starting a pixel adjacent to the coding target block in the input image;
wherein the deciding includes deciding whether to code the residual block, based on a sum of absolute values of the residual pixel values of the initial residual block.

13. The method according to claim 8, wherein
the generating includes generating a plurality of prediction blocks,
the deciding includes deciding not to code the residual block when pixel values of corresponding pixels among the plurality of prediction blocks are equal, and deciding to code the residual block when pixel values of corresponding pixels among the plurality of prediction blocks are not equal.

14. The method according to claim 8, further comprising:
quantizing the input image;
wherein the generating includes accepting quantized pixel values of each block of the quantized image by the quantizing.

15. A non-transitory computer readable medium for causing a computer to perform a method for coding a coding target block in an input image, the method comprising:
acquiring the input image;
generating a prediction block to be used for prediction of the coding target block based on at least one reference block in the input image, each number of pixels in the coding target block and the prediction block being a power of two, the at least one reference block including at least one pixel included in the coding target block;
calculating a residual block having residual pixel values between the coding target block and the prediction block;
deciding whether to code the residual block, based on pixel values of at least one of the coding target block, the reference block and the prediction block;
coding the residual block; and
counting up the number of residual blocks not being continuously coded,
wherein
the at least one reference block is a plurality of reference blocks adjacent to the coding target block in the input image,
the deciding includes deciding not to code the residual block when pixel values of corresponding pixels among the plurality of reference blocks are equal and when a sum of absolute values of pixel values of the residual block is equal to "0", and deciding to code the residual block when pixel values of corresponding pixels among the plurality of reference blocks are not equal or when a sum of absolute values of pixel values of the residual block is not equal to "0",
the counting includes counting up the number of residual blocks when a sum of the absolute values of pixel values of the residual block is equal to "0", and coding the number of residual blocks which is counted up,
the coding includes coding the residual block by variable length coding when the residual block is decided to be coded, and coding the number of residual blocks when a sum of absolute values of pixel values of the residual block is not equal to "0".

* * * * *